Patented Feb. 20, 1940

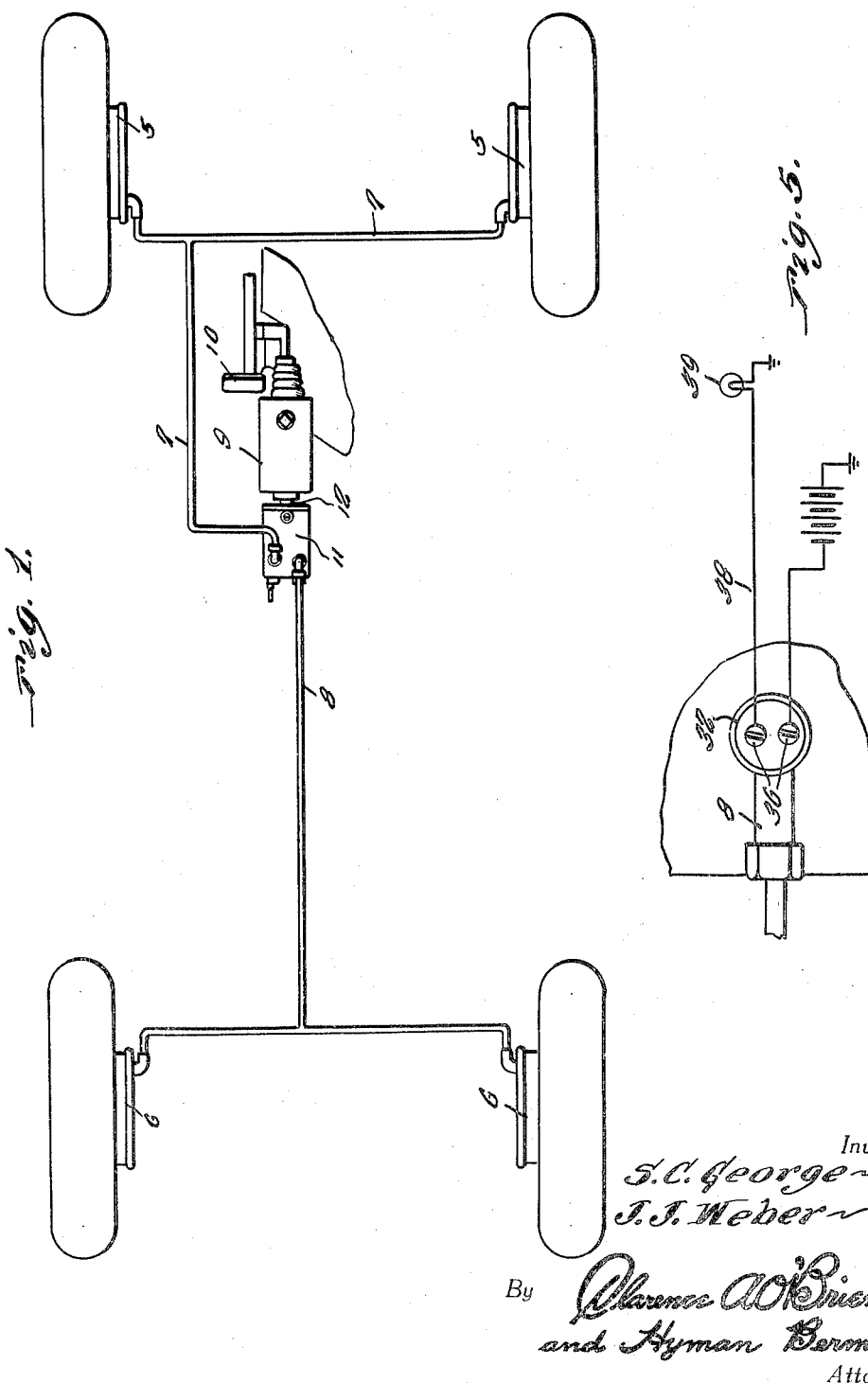

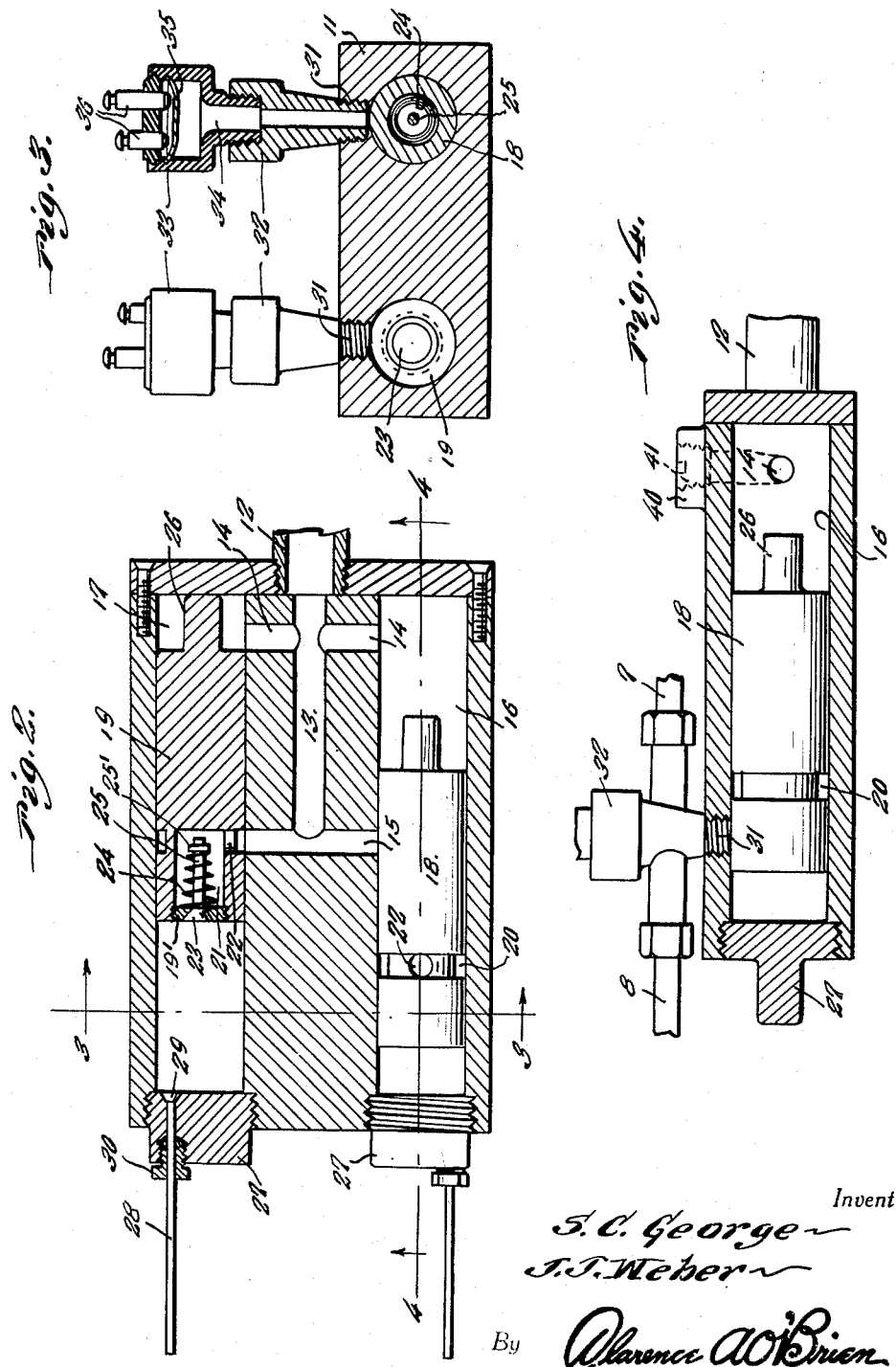

2,190,872

UNITED STATES PATENT OFFICE 2,190,872

SAFETY DEVICE FOR HYDRAULIC BRAKE SYSTEMS

Simon C. George and John J. Weber, Pittsburgh, Pa.

Application May 18, 1939, Serial No. 274,454

8 Claims. (Cl. 303—84)

The present invention relates to new and useful improvements in hydraulic brake systems for motor driven vehicles, or other vehicles equipped with a hydraulic brake system, and has for its primary object to provide a safety attachment to prevent a failure of all of the brakes should the feed line leading to one of the brakes develop a leak and whereby the flow of fluid through the leaking line will be automatically arrested.

More specifically, the present invention comprises a pressure actuated plunger responsive to the pressure from the master brake cylinder to produce a braking action to the respective wheels and in which the plunger serves to cut off the flow of fluid in the brake line associated therewith upon a predetermined movement of the plunger.

Another object is to provide a tell-tale signal associated with each of the feed lines leading to the respective brakes which will automatically indicate a breakage or failure of said line.

A still further object is to provide means for conveniently replenishing the fluid in the broken line, after the same has been repaired.

Other objects and advantages reside in the details of construction and operation as more fully hereinafter described and claimed, reference being had to the accompanying drawings forming part hereof, wherein like numerals refer to like parts throughout, and in which—

Figure 1 is a plan view illustrating the application of the invention to a hydraulic vehicular brake system.

Figure 2 is an enlarged longitudinal sectional view through the safety attachment.

Figure 3 is a transverse sectional view taken substantially on a line 3—3 of Figure 2.

Figure 4 is a longitudinal sectional view taken substantially on a line 4—4 of Figure 2, and Figure 5 is a diagrammatic view of the circuit for the tell-tale signal connected with the pressure actuated switch.

Referring now to the drawings in detail, the numerals 5—5 indicate the brakes associated with the front wheels of an automobile, while the numerals 6—6 indicate the brakes associated with the rear wheels thereof.

The fluid feed line for the brakes 5 is indicated by the reference numeral 7 while the fluid feed line for the wheel brakes 6 is indicated by the reference numeral 8. The master cylinder assembly of the hydraulic brake system is indicated generally at 9, and the brake pedal connected therewith is indicated by the reference numeral 10. The improved safety device forming the subject matter of the present invention comprises a block or casting 11, which in the present embodiment of the invention, is connected with the master cylinder by a nipple 12.

The nipple 12 communicates with a longitudinally extending duct 13 formed in the block communicating with a front lateral passage or duct 14 and a rear lateral duct 15, each of said ducts having communication with cylinders 16 and 17 formed in parallel relation in opposite sides of the casting.

Pistons 18 and 19 are freely slidable with a working fit in the respective cylinders 16 and 17, each of the pistons being of identical construction, and accordingly a detailed explanation of one will suffice for both. The pistons, at an intermediate portion, are provided with an annular groove 20 communicating with a chamber 21 in the rear end of the piston by means of a lateral port 22. The outer end of the chamber is closed by a threaded plug 19' having a valve seat formed therein engaged by a valve 23 arranged to open outwardly in response to internal pressure in the chamber, and yieldably maintained in closed position by means of an expansible coiled spring 24 mounted on the valve stem 25. One end of the spring abuts a nut 25' carried by the valve stem while the other end of the spring abuts the plug 19'.

The front end of the piston is provided with a reduced stem 26 adapted to abut the front end of the casting to space the body of the piston rearwardly from the front end of the cylinder to enable fluid to enter the cylinder through the duct 14 in advance of the piston.

The front ends of the cylinders 16 and 17 are closed while plugs 27—27 are threaded in the rear ends thereof to close the same. Slidably mounted in each of the plugs is a rod 28 having a valve-shaped head 29 formed at the inner end of the rod, said rod being off-set concentrically with respect to the cylinders and the valve head 29 being countersunk at the inner side of the plug. The outer end of the rod 28 extends through a packing gland 30 and projects outwardly beyond the plug.

Ports 31—31 are formed in the casting adjacent the rear end thereof for communication with the respective cylinders beyond the rear ends of the pistons when the latter are in their forwardmost positions. Threaded in the ports 31 are nipples 32—32, one of the nipples having the rear brake line 8 connected thereto while the other of said nipples has the front brake line 7 attached thereto. Also threaded in the nipples is a switch housing 33 having a passage 34 in its lower threaded end communicating with the nipples and mounted in the chamber is a resilient diaphragm 35 of conductive material adapted to bridge a pair of contacts 36—36 by the fluid pressure entering the nipple 32 from the respective cylinders. The diaphragm is normally concaved as shown in Figure 3 to break the circuit with the contacts upon a failure of the pressure in the fluid line. Circuit wires 38 are connected to the terminals 36 leading to a lamp 39 mounted in a convenient position to serve as a tell-tale signal to the driver of the vehicle.

The casting 11 is also provided with an internally threaded boss 40 forming a port communicating with the duct 13 at its junction with the duct 14 and to which the master cylinder may be connected in lieu of the nipple 12, should it be desired to mount the casting with the pistons 18 and 19 either in a vertical or in a transverse position. The boss, when not in use, is closed by a plug 41. It will also be understood the casting 11 may be manufactured as an integral unit with the master cylinder 9 if desired.

In the operation of the device with the respective brake lines filled with the fluid and the master cylinder likewise supplied with the necessary quantity of fluid and with the pistons 18 and 19 in their forwardmost position as indicated by the piston 19 in Figure 2, the application of the brake pedal to create a fluid pressure in the master cylinder will cause the pistons to move rearwardly, thus transmitting the pressure to the fluid lines 7 and 8 leading to the respective front and rear brakes. The pressure at the opposite ends of the piston being normally equalized, the valve 23 will remain closed during the brake applying action, which instantly causes the pistons to close the ports 15, adequate movement of the pistons being possible before the piston reaches the ports 31. However, upon loss of the fluid in the brake lines leading to the brakes, the pressure of the fluid in the ducts connected with the master cylinder will move the piston in the affected line rearwardly so that the rear end of the piston will close the port 31 leading to the affected line. At the same time the reduction of the pressure in the chamber 34 will permit the diaphragm 35 to move downwardly, thus opening the circuit connected with the telltale signal 39.

When the brake in the affected line has been repaired the rod 28 is moved inwardly to return the piston to its forward position with the port 22 in registry with the duct 15 whereby pressure from the master cylinder will force the valve 23 open to again fill the brake line with fluid until the pressure at the opposite ends of the piston is equalized.

It is believed the details of construction and manner of operation of the device will be readily understood from the foregoing without further detailed explanation.

Having thus described the invention, what we claim is:

1. In a hydraulic brake system for vehicles, the combination with the front and rear wheel brakes, a master cylinder, fluid passages connecting the master cylinder with the wheel brakes, a piston slidably mounted in one portion of said passages and responsive to the pressure of the master cylinder to create a brake applying pressure in another portion of said passages and a valved passage in the piston having free communication with the passage leading to the master cylinder during normal brake applying movement of the piston, said valved passage being closed upon a predetermined brake applying movement of the piston.

2. In a hydraulic brake system for vehicles, the combination with the front and rear wheel brakes, a master cylinder, fluid passages connecting the master cylinder with the wheel brakes, a piston slidably mounted in one portion of said passages and responsive to the pressure of the master cylinder to create a brake applying pressure in another portion of said passages and a valved passage in the piston having free communication with the passage leading to the master cylinder during normal brake applying movement of the piston, said valved passage being closed upon a predetermined brake applying movement of the piston and means operable outwardly of the passages for retaining the piston in position with its valved passage in open communication, the valve being responsive to the pressure of the master cylinder for opening movement to provide uninterrupted communication between all of the passages.

3. In a hydraulic brake system for vehicles, the combination with the front and rear wheel brakes, a master cylinder, fluid pressure conduits leading to the wheel brakes and means for transmitting pressure from the master cylinder to the conduits and comprising a slidably mounted valved piston responsive to the fluid pressure of the master cylinder and in which the valve is maintained in a closed position when pressure at each end of the piston is equalized and adapted for opening movement when the pressure in advance of the piston exceeds the pressure behind the piston.

4. In a hydraulic brake system for vehicles the combination with the front and rear wheel brakes, a master cylinder, conduits for supplying fluid from the master cylinder to the respective brakes, of a pressure responsive device adapted to transmit pressure from the master cylinder to the conduits and comprising a housing having a plurality of cylinders leading to the respective brakes, pistons freely mounted in each of the cylinders, a passage in the casting communicating with the front end of each cylinder in advance of the piston, a valved passage in the rear end of the piston and a lateral port in the piston providing communication between said valved passage and said first named passages.

5. In a hydraulic brake system for vehicles the combination with the front and rear wheel brakes, a master cylinder, conduits for supplying fluid from the master cylinder to the respective brakes, of a pressure responsive device adapted to transmit pressure from the master cylinder to the conduits and comprising a casting having a plurality of cylinders leading to the respective brakes, pistons freely mounted in each of the cylinders, a passage in the housing communicating with the front end of each cylinder in advance of the piston, a valved passage in the rear end of the piston and a lateral port in the piston providing communication between said valved passage and said first named passages, said port being movable out of communicating position upon a predetermined movement of the piston.

6. In a hydraulic brake system for vehicles the combination with the front and rear wheel brakes, a master cylinder, conduits for supplying fluid from the master cylinder to the respective brakes, of a pressure responsive device adapted to transmit pressure from the master cylinder to the conduits and comprising a housing having a pair of parallel cylinders formed therein, a passage in the housing communicating with the master cylinder, lateral passages connecting the first named passage with the cylinders at longitudinally spaced points, a piston freely slidable in each cylinder, one of the lateral passages being arranged in advance of the front end of the piston, a circumferential groove in the piston normally communicating with another of the lateral passages when pressure at the ends of the piston is equalized, a chamber in the rear end of the piston, a lateral port in the groove connecting the chamber with said last named lateral passage, a spring retracted valve in the rear end of the chamber adapted for opening movement upon a predetermined excess pressure at the front end of the piston and means operable outwardly of the casting for manually positioning the piston with the chamber in communication with its lateral passage.

7. In a hydraulic brake system for vehicles the combination with the front and rear wheel brakes, a master cylinder, conduits for supplying fluid from the master cylinder to the respective brakes, of a pressure responsive device adapted to transmit pressure from the master cylinder to the conduits and comprising a casting having a pair of parallel cylinders formed therein, a passage in the casting communicating with the master cylinder, lateral passages connecting the first named passage with the cylinders at longitudinally spaced points, a piston freely slidable in each cylinder, one of the lateral passages being arranged in advance of the front end of the piston, a circumferential groove in the piston normally communicating with another of the lateral passages when pressure at the ends of the piston is equalized, a chamber in the rear end of the piston, a lateral port in the groove connecting the chamber with said last named lateral passage, a spring retracted valve in the rear end of the chamber adapted for opening movement upon a predetermined excess pressure at the front end of the piston and a manually operable rod mounted in the housing and adapted for positioning the piston with its chamber in communication with its associated lateral passage.

8. In a hydraulic brake system for vehicles the combination with the front and rear wheel brakes, a master cylinder, conduits for supplying fluid from the master cylinder to the respective brakes, of a pressure responsive device adapted to transmit pressure from the master cylinder to the conduits and comprising a housing having a plurality of cylinders leading to the respective brakes, pistons freely mounted in each of the cylinders, a passage in the housing communicating with the front end of each cylinder in advance of the piston, a valved passage in the rear end of the piston and a lateral port in the piston providing communication between said valved passage and said first named passages, said port being movable out of communicating position upon a predetermined movement of the piston and a pressure responsive signal device connected to each of the conduits.

SIMON C. GEORGE.
JOHN J. WEBER.